US010344907B2

(12) United States Patent
Walton

(10) Patent No.: US 10,344,907 B2
(45) Date of Patent: *Jul. 9, 2019

(54) VEHICLE JACK STAND

(71) Applicant: Jackpoint Jackstands LLC, Batavia, IL (US)

(72) Inventor: John A. Walton, Batavia, IL (US)

(73) Assignee: Jackpoint Jackstands LLC, Batavia, IL (US)

( * ) Notice: Subject to any disclaimer, the term of this patent is extended or adjusted under 35 U.S.C. 154(b) by 18 days.

This patent is subject to a terminal disclaimer.

(21) Appl. No.: 15/049,842

(22) Filed: Feb. 22, 2016

(65) Prior Publication Data
US 2016/0169439 A1    Jun. 16, 2016

Related U.S. Application Data

(63) Continuation of application No. 13/946,455, filed on Jul. 19, 2013, now Pat. No. 9,273,818, which is a continuation of application No. 13/472,884, filed on May 16, 2012, now Pat. No. 8,500,096, which is a continuation of application No. 12/412,585, filed on Mar. 27, 2009, now Pat. No. 8,181,936.

(60) Provisional application No. 61/072,177, filed on Mar. 28, 2008.

(51) Int. Cl.
  *F16M 11/00* (2006.01)
  *B66F 5/00* (2006.01)
  *B66F 13/00* (2006.01)
  *F16M 11/20* (2006.01)
  *F16M 11/24* (2006.01)

(52) U.S. Cl.
  CPC ............... *F16M 11/00* (2013.01); *B66F 5/00* (2013.01); *B66F 13/00* (2013.01); *F16M 11/20* (2013.01); *F16M 11/24* (2013.01)

(58) Field of Classification Search
  CPC ........ F16M 11/00; F16M 11/22; F16M 11/24; B66F 13/00; B66F 5/04
  USPC .......................................... 254/8 B
  See application file for complete search history.

(56) References Cited

U.S. PATENT DOCUMENTS

| 1,521,764 | A | * | 1/1925 | Graver | .................. B66F 13/00 248/161 |
| 1,894,293 | A | * | 1/1933 | Green | ...................... B66F 1/06 248/352 |
| D138,395 | S | | 8/1944 | Howard | |
| 2,439,854 | A | * | 4/1948 | Lipski | .................... F16M 11/24 248/352 |
| 2,767,855 | A | | 10/1956 | Brown | |
| 2,903,226 | A | | 9/1959 | D'Haveloose | |

(Continued)

OTHER PUBLICATIONS

Office Action for U.S. Appl. No. 12/412,585, dated Sep. 2, 2011.

*Primary Examiner* — Joseph J Hail
*Assistant Examiner* — Henry Y Hong
(74) *Attorney, Agent, or Firm* — Marshall, Gerstein & Borun LLP

(57) ABSTRACT

A jack stand for a vehicle includes a plurality of walls joined together to form a body, the body being hollow. A base is formed by lower edges of the walls and a top surface joins top edges of the walls. One of the walls includes a wall opening and the top includes a top opening, the wall opening and the top opening extending towards one another, meeting proximate the top edge of one of the walls, thereby forming a single, continuous opening extending from the top into one of the walls.

18 Claims, 4 Drawing Sheets

(56) References Cited

U.S. PATENT DOCUMENTS

| | | | |
|---|---|---|---|
| 3,028,142 A | 4/1962 | Friesen | |
| 3,493,209 A | 2/1970 | Brammer | |
| 3,606,254 A * | 9/1971 | Olson | B66F 1/06 254/111 |
| 3,891,177 A * | 6/1975 | Jerrel | B25H 1/0007 248/352 |
| 3,920,212 A * | 11/1975 | Westwood | B66F 13/00 248/346.01 |
| 4,014,517 A * | 3/1977 | Keagle | B66F 13/00 248/157 |
| 4,042,202 A * | 8/1977 | Molinari | B66F 13/00 248/352 |
| 4,245,808 A * | 1/1981 | John | B66F 3/08 248/165 |
| 4,404,780 A | 9/1983 | Josephson | |
| 4,461,491 A | 7/1984 | Eklund | |
| 4,856,747 A * | 8/1989 | Gano | F16M 11/046 248/352 |
| 5,071,002 A | 12/1991 | Bradley | |
| 5,497,891 A * | 3/1996 | Hannon | A47F 7/0021 206/315.1 |
| 5,520,360 A * | 5/1996 | Wensman | F16M 11/046 248/188.5 |
| 5,595,366 A | 1/1997 | Cusimano et al. | |
| 5,657,868 A | 8/1997 | Taylor | |
| 5,901,935 A * | 5/1999 | Lai | F16M 11/046 248/354.1 |
| 5,915,672 A * | 6/1999 | Dickey | B66F 3/24 248/352 |
| 6,334,598 B1 | 1/2002 | Gutzke et al. | |
| 6,375,160 B1 * | 4/2002 | Hung | B66F 5/00 254/133 R |
| 6,478,267 B1 | 11/2002 | Whitman et al. | |
| 6,565,068 B1 * | 5/2003 | Arzouman | B66F 3/12 254/126 |
| 6,581,785 B1 | 6/2003 | Falkenstein | |
| 6,601,827 B1 * | 8/2003 | Arzouman | B66F 3/12 254/126 |
| 6,644,615 B1 * | 11/2003 | Liu | B66F 13/00 248/346.07 |
| 7,207,548 B1 | 4/2007 | Howe | |
| 7,588,341 B2 * | 9/2009 | Lin | A47G 19/2227 254/45 |
| 7,878,482 B2 | 2/2011 | Hernandez, Jr. | |
| 8,181,936 B2 * | 5/2012 | Walton | B66F 5/00 211/24 |
| 2003/0218157 A1 * | 11/2003 | Arzouman | B66F 13/00 254/8 B |
| 2003/0218159 A1 * | 11/2003 | Arzouman | B66F 5/04 254/8 B |
| 2004/0084596 A1 | 5/2004 | Valentz et al. | |
| 2005/0056818 A1 * | 3/2005 | Harrah | B66F 3/25 254/133 R |
| 2005/0121584 A1 * | 6/2005 | Hartmann | B66F 13/00 248/352 |
| 2005/0253121 A1 * | 11/2005 | Miner | B66F 5/00 254/8 B |
| 2006/0071139 A1 * | 4/2006 | Lemirande | B66F 13/00 248/352 |
| 2008/0099745 A1 * | 5/2008 | Arzouman | B66F 1/06 254/8 B |
| 2008/0099748 A1 * | 5/2008 | Arzouman | B66F 5/04 254/8 B |
| 2008/0137338 A1 * | 6/2008 | Lin | A47G 19/2227 362/253 |
| 2013/0048931 A1 * | 2/2013 | Schumacher | B66F 3/12 254/8 B |
| 2013/0248786 A1 * | 9/2013 | Galla | B66F 5/04 254/2 B |
| 2014/0145044 A1 * | 5/2014 | Ceravolo | F16M 11/22 248/157 |
| 2014/0191093 A1 * | 7/2014 | Ceravolo | F16M 13/022 248/157 |
| 2014/0306084 A1 * | 10/2014 | Klinzmann | F16M 11/046 248/423 |
| 2015/0028177 A1 * | 1/2015 | Vargas | B66F 13/00 248/542 |
| 2015/0122965 A1 * | 5/2015 | Arzouman | B66F 13/00 248/423 |
| 2015/0308612 A1 * | 10/2015 | Chen | F16M 11/28 248/352 |

* cited by examiner

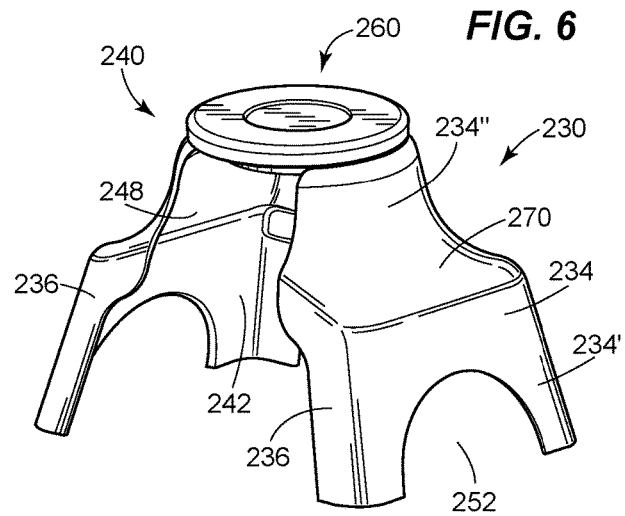
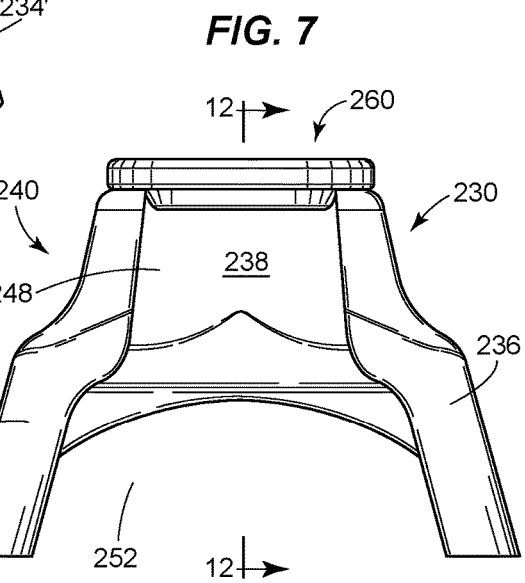
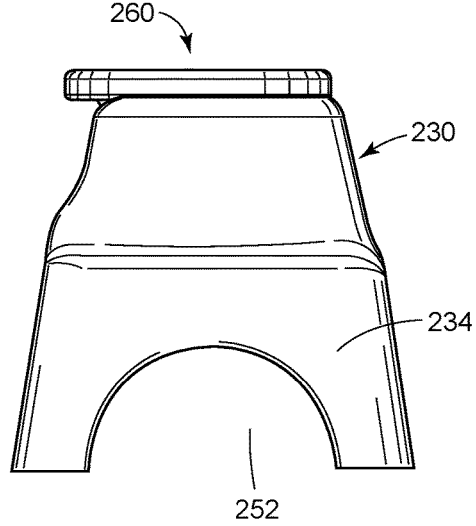
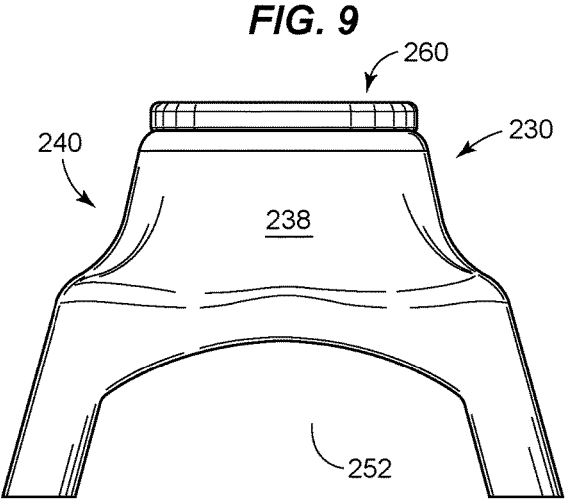

VEHICLE JACK STAND

RELATED APPLICATIONS

This application is a continuation of U.S. patent application Ser. No. 13/946,455, filed Jul. 19, 2013, which is a continuation of U.S. patent application Ser. No. 13/472,884 filed on May. 16, 2012 (now U.S. Pat. No. 8,500,096), which is a continuation of U.S. patent application Ser. No. 12/412,585 filed on Mar. 27, 2009 (Now U.S. Pat. No. 8,181,936), which claimed priority benefit of U.S. Provisional Patent Application Ser. No. 61/072,177 filed Mar. 28, 2008. The entirety of U.S. patent application Ser. Nos. 13/946,455, 13/472,884, 12/412,585, and U.S. Patent Application No. 61/072,177 are hereby incorporated by reference herein.

BACKGROUND

Field of the Disclosure

The invention relates generally to jack stands for vehicles and specifically to universal jack stands that can be used with a variety of vehicle jacks and jack stands that support a vehicle at a common jacking location with the jack.

Related Technology

Elevating a portion of a vehicle typically involves using some sort of jack. For example, many automobiles carry a scissor-type jack to elevate a portion of the automobile in order to change a tire. The jack is placed under a portion of the frame of the automobile and the jack is slowly raised until a platform on the jack engages the frame of the automobile. Thereafter, a user uses the principle of leverage to elevate a portion of the frame. Often, more than one location on the frame needs to be elevated so that a user can repair a portion of the automobile that is only accessible from the bottom. Because most standard jacks are movable, so that the jack may be easily moved to many different portions of the frame, a vehicle supported solely by the jack may be unstable and unsafe to work under. For this reason, a user may place a jack stand under the frame and lower the jack so that the vehicle is supported on the jack stand instead of the jack itself. The jack stand is typically a stable platform for supporting the vehicle. Because the jack and jack stand have individual and separate support structures, the jack stand and jack typically cannot support the vehicle at same location on the frame. This can cause a problem when a manufacturer designates only certain locations as jacking locations. Generally, vehicle manufacturers reinforce certain locations on the frame of a vehicle so that those certain locations can support a portion of the weight of the vehicle when the vehicle is elevated with a jack (hereinafter these locations on the vehicle frame are referred to as "jacking locations").

Generally, jack stands are pyramid-shaped structures having three or four sides and an adjustable support platform disposed in the top of the jack stand. For example, U.S. Pat. No. 7,207,548 discloses a more or less typical jack stand including four sides that form the shape of a pyramid, a telescoping support member extending from a top portion of the pyramid and a curved horizontal support, often having a U-shape, at the top of the telescoping support member to cradle a portion of the vehicle frame. The support member is often adjustable with a ratchet type mechanism. Problems occur with placement of this type of platform as only certain parts of the frame or undercarriage can fit in the curved horizontal support. While a jack stand is usually more stable than a jack, the jack stand cannot support the vehicle at the same point that is occupied by the jack. As a result, the jack stand often must be placed a considerable distance away from the jacking location in order to find a portion of the frame or undercarriage that is compatible with the top of the support platform, necessarily requiring a higher jacking elevation to accommodate the jack stand location.

In order to solve this problem, systems have been designed to elevate the vehicle with the jack stand itself. For example, U.S. Patent Publication No. 2008/00999745 discloses a three stage jack stand. A lift collar on the top of the jack stand is elevated by a specially designed unique power unit. The power unit includes a pair of lift arms that engage a lower portion of the lift collar on the jack stand. When the jack stand is placed under a vehicle, the lift arms on the power unit move upward to engage a bottom of the lift collar on the jack stand. The lift collar fully supports and elevates the vehicle at all times during the jacking process. One drawback to this type of arrangement is that the jack stand and the power unit are specially designed for one another. Thus, this type of jack stand and power unit are not compatible with contemporary vehicle jacks, such as scissor jacks, floor jacks or racing jacks. Moreover, this type of power unit is not compatible with typical jack stands and/or may be too tall to fit under some vehicles.

SUMMARY OF THE DISCLOSURE

In one embodiment, a jack stand for a vehicle includes a plurality of walls joined together to form a body, the body being hollow. A base is formed by lower edges of the walls and a top surface joins top edges of the walls. One of the walls includes a wall opening and the top includes a top opening, the wall opening and the top opening extending towards one another, meeting proximate the top edge of one of the walls, thereby forming a single, continuous opening extending from the top into one of the walls.

In another embodiment, a combination of a jack stand and a jack pad are disclosed. The jack stand includes a plurality of walls joined together to form a body, the body being hollow. A base is formed by lower edges of the walls and a top surface joins top edges of the walls. One of the walls includes a wall opening and the top includes a top opening, the wall opening and the top opening extending towards one another, meeting proximate the top edges of one of the walls, thereby forming a single, continuous opening extending from the top into one of the walls. An upturned lip surrounds at least a portion of the top opening. The jack pad includes an upper support portion having a downturned rail disposed along a perimeter of the upper support portion. The jack pad also includes an extension extending downward from the jack pad, the extension being separated from the downturned rail by an inverted slot. When the jack pad rests on the upturned lip of the jack stand, the upturned lip is disposed in the inverted slot.

A method of elevating a portion of a vehicle is also disclosed. The method includes providing a jack, removably placing a jack pad on one end of the jack and placing the jack and jack pad under the vehicle. The jack is extended until the jack pad contacts and elevates a portion of the vehicle. A jack stand is provided that includes a plurality of walls joined together to form a hollow body. A top surface joins the top edges of the walls, the top surface including an opening. At least one wall also includes an opening. The opening in the top surface and the opening in the at least one wall extend towards one another joining together proximate the top edge of the at least one wall, thereby forming a single, continuous opening. The jack stand is positioned around the jack so that a portion of the jack is at least partially located within the hollow body. The jack is lowered until the jack pad is supported by a top portion of the jack stand. The jack stand is removed, the vehicle being supported by the jack pad and jack stand.

BRIEF DESCRIPTION OF THE DRAWINGS

Objects, features, and advantages of the present invention will become apparent upon reading the following description in conjunction with the drawing figures, in which:

FIG. 6 is a front perspective view of another alternate embodiment of a jack stand and jack pad constructed in accordance with the teachings of the disclosure.

FIG. 7 is a front elevational view of the jack stand and jack pad of FIG. 6.

FIG. 8 is a side elevational view of the jack stand and jack pad of FIG. 6.

FIG. 9 is a back elevational view of the jack stand and jack pad of FIG. 6.

DETAILED DESCRIPTION

The disclosed jack stands are simple to manufacture and compatible with most typical vehicle jacks, such as, for example, scissor jacks, floor jacks, racing jacks, etc. The components may be manufactured from strong, rugged materials, such as steel, aluminum, titanium, composite materials, or any other metal or non-metal material that is capable of supporting the weight of a vehicle. The disclosed jack stands may be manufactured by molding or welding or any other appropriate manufacturing technique. The disclosed jack stands overcome the problems in the prior art by allowing a single jacking location to be utilized by both the jack and the jack stand. In this manner, the disclosed jack stand prevents damage to vehicles caused by supporting the vehicles in non-approved jacking locations. Moreover, the disclosed jack stand is adaptable to manufacturer's proprietary jacking locations by including an interchangeable jack pad for use on both the jack and the jack stand.

Figure 1:
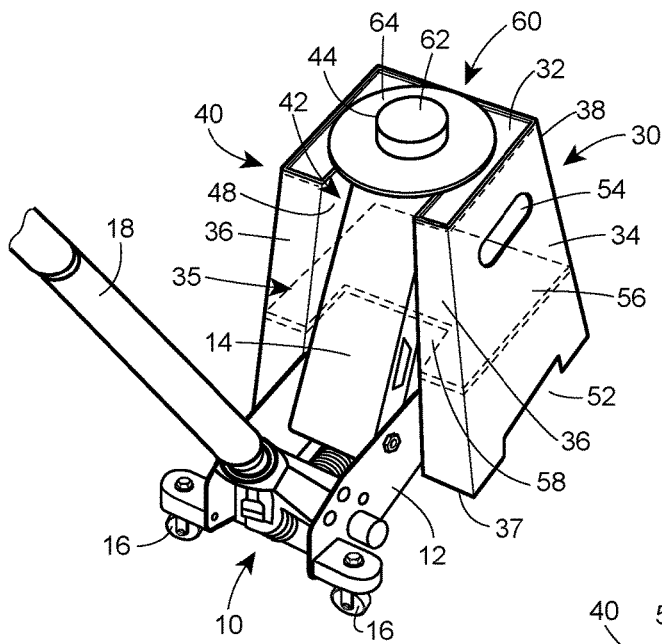
FIG. 1 is a front perspective view of a jack stand and jack pad constructed in accordance with the teachings of the disclosure and mated with a typical racing-type floor jack.

Turning now to FIG. 1, a typical racing style floor jack 10 is illustrated in a mated position with a jack stand 30 constructed in accordance with the teachings of the disclosure. Additionally, a jack pad 60 is illustrated resting on a top surface 32 of the jack stand 30. The floor jack 10 may include a frame 12 supporting a lifting arm 14. The lifting arm 14 may be mechanically or hydraulically actuated. The lifting arm 14 is extendable to an elevated position, as shown in FIG. 1 and retractable to a stowed position in which the lifting arm 14 lays in an essentially horizontal position adjacent the frame 12. The floor jack 10 may also include a plurality of wheels 16 to facilitate movement of the floor jack 10 from one location to another location. The floor jack 10 may also include a handle 18 for a user to grasp manipulate the floor jack 10.

The jack stand 30 includes one or more side walls 34, a pair of front walls 36 and a back wall 38. The front walls 36, side walls 34, and back wall 38 form a pyramid-like body 40 having a hollow center portion 42. The hollow center portion 42 is sized to receive at least a portion of the floor jack 10. For example, in the embodiment shown in FIGS. 1-3, the hollow center portion 42 receives part of the lifting arm 14 and frame 12 of the floor jack 10. The generally planar top 32 may be slightly recessed with respect to top edges of the side walls 34, front walls 36, and back wall 38 forming a ridge or lip 44 along the top 32 of the body 40. The ridge or lip 44 prevents the jack pad 60 from sliding off of the jack stand 30 as will be discussed hereinafter. The top 32 also includes a top opening 46 sized to allow a portion of the lift arm 14 to extend upward, through the top opening 46. The front walls 36 are spaced apart from one another forming a front opening 48. The front opening 48 and the top opening 46 join together to form a single opening that extends from the top 32 all the way through the front 35 of the body 40 and to the bottom 37 of the jack stand 30. This single opening allows a portion of the floor jack 10 to be inserted into the hollow center portion 42 of the jack stand 30. Moreover, the lifting arm 14 of the floor jack 10 may be extended or retracted while the floor jack 10 is partially disposed in the hollow center portion 42. The jack stand 30 may optionally include one or more adjustable feet 50 for leveling the jack stand 30 on uneven surfaces.

Figure 2:
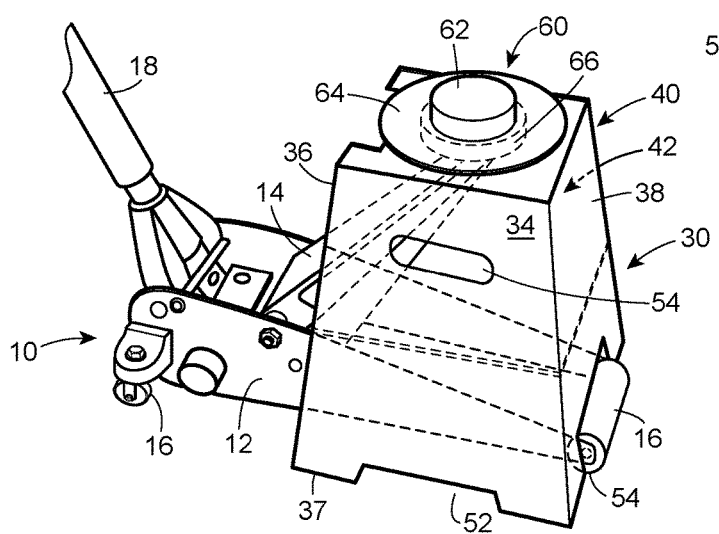
FIG. 2 is side perspective view of the jack stand, jack pad and racing-type floor jack of FIG. 1.

The jack stand 30 may also include a plurality of lower windows 52 and 54 in the side and back walls. The window 54 in the back wall 38 may be sized to allow front wheels or roller 16 of the floor jack 10 to extend outward from the hollow center portion 42 (FIG. 2). In this way, the floor jack 10 can be inserted into the jack stand 30 to a greater degree than otherwise possible without the window 54. This facilitates locating the floor jack 16 and lift arm 14 at least partially inside the jack stand 30 so that the jack pad 60 can be lowered onto and at least partially supported by the top surface 32 of the jack stand 30. Moreover, the jack stand 30 may include one or more side openings 54 that may function as handles when moving the jack stand 30. The jack stand 30 may also optionally include one or more shelves 56. The shelf 56 may be generally parallel to the top 32 and may join the front walls 36, the side walls 34 and the back wall 38. The shelf 56 may serve to structurally strengthen the body 40 when the jack stand 30 is supporting a vehicle. Additionally, the shelf 56 may serve as a tool or jack pad 60 storage location. The shelf 56 may optionally include a front cut out portion 58 to allow a deeper insertion of the floor jack 10 into the hollow center portion 42.

The jack pad 60 rests on a free end of the lifting arm 14 or the top 32 of the jack stand. The jack pad 60 is removable from either the lifting arm 14 or the top 32. The jack pad 60 generally rests on the higher of the lifting arm 14 and the top 32. The jack pad 60 includes an upper support portion 62 that engages the vehicle and a flange 64. While a circular jack pad 60 is illustrated, the jack pad 60 can take on virtually any shape, such as triangle, square, rectangle, polygon, oval, etc. The jack pad 60 and the top opening 46 in the jack stand 30 are made so that the jack pad 60 can be at least partially supported on the top 32 of the jack stand 30. The jack pad 60 also includes a lower support portion 66 that rests on a free end of the lifting arm 14. The lower support portion 66 may include one or more recessed areas (not shown in FIGS. 1 and 2) that fit over a portion of the free end of the lifting arm 14 to stabilize the jack pad 60 on the lifting arm 14.

In operation, a user places the jack pad 60 on the free end of the lifting arm 14. The floor jack 10 is then placed under the vehicle at an appropriate, or manufacturer designated, jacking location. The lifting arm 14 is elevated until the upper support portion 62 engages the jacking location on the vehicle. The lifting arm 14 is then raised further to elevate a portion of the vehicle. Once the lifting arm 14 elevates the portion of the vehicle to a desired height, the jack stand 30 is placed beside the floor jack 10 and pushed under the vehicle with the front 35 of the jack stand facing outward. The jack stand 30 may then be moved laterally behind the floor jack 10 to align the front opening 48 with the floor jack 10. The jack stand 30 may then be pulled outward such that the floor jack 10 penetrates the front opening 48, the jack stand 30 surrounding a portion of the floor jack 10. When the jack stand 30 is positioned such that the free end of the lifting arm 14 and the jack pad 60 are centered in the top opening 46, the lifting arm 14 may be lowered sufficiently so that the flange 64 of the jack pad 60 contacts the top 32 of the jack stand 30. As the lifting arm 14 is lowered further, the flange 64 and the top 32 prevent the jack pad 60 from being lowered with the lifting arm 14. Thus, the jack pad 60 becomes fully supported by the top 32 and disengaged from the lifting arm 14. The vehicle is now fully supported by the jack stand 30 instead of the floor jack 10. As the lifting arm 14 is lowered to the point where the free end of the lifting arm 14 clears the lower support portion 66 of the jack pad 60, the floor jack 10 may be removed from the jack stand 30. Throughout the entire jacking process, the same jacking location is used to support the vehicle on the floor jack 10 and the jack stand 30. In this way, a user can be sure that the jacking location is structurally strong enough to support the vehicle because the user is using a manufacturer recommended jacking location. Moreover, the disclosed jack stand is compatible with most common jacks.

Figure 3:
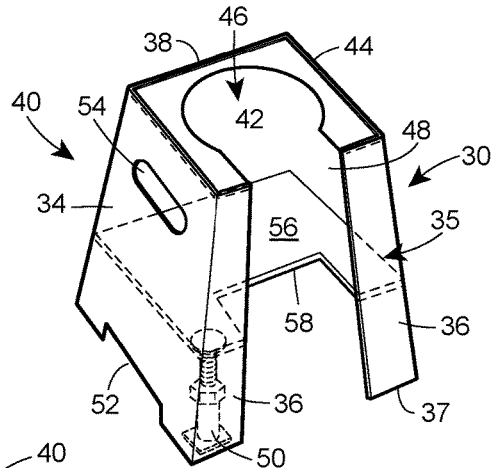
FIG. 3 is a front perspective view of the jack stand of FIG. 1.
Figure 4:
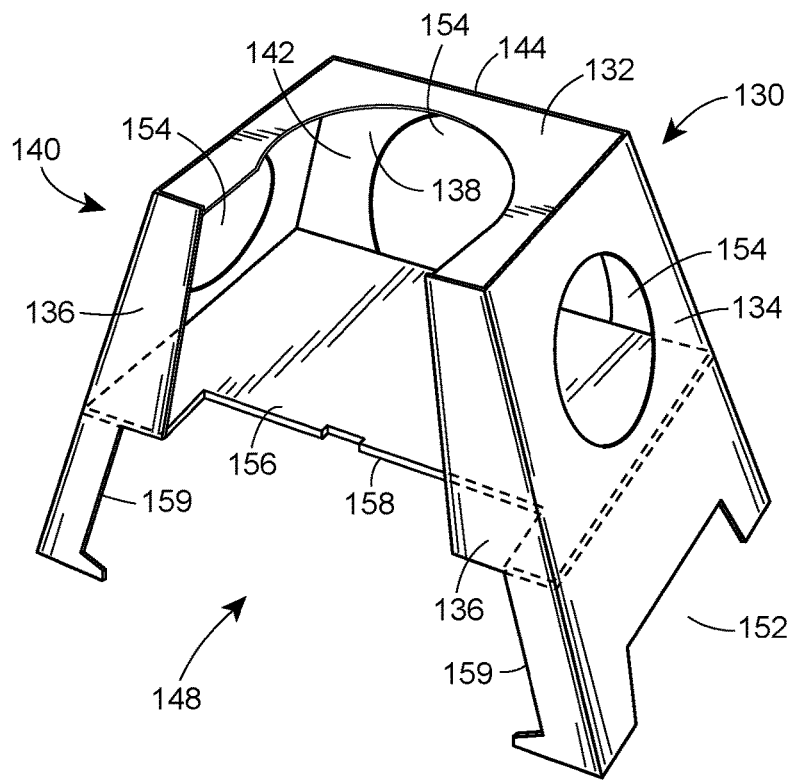
FIG. 4 is a front perspective view of an alternate embodiment of a jack stand constructed in accordance with the teachings of the disclosure.
Figure 5:
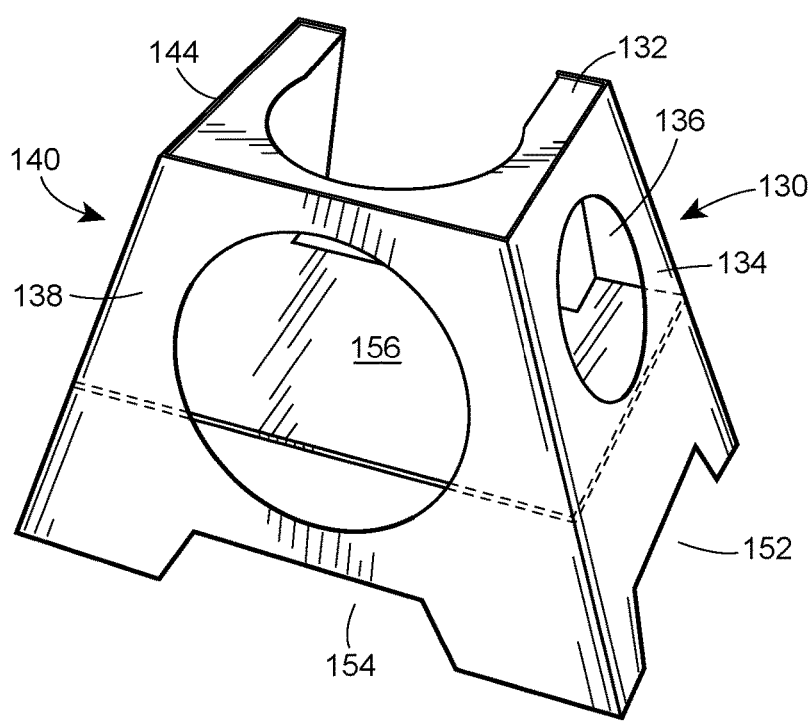
FIG. 5 is a back perspective view of the jack stand of FIG. 4.
Figure 10:
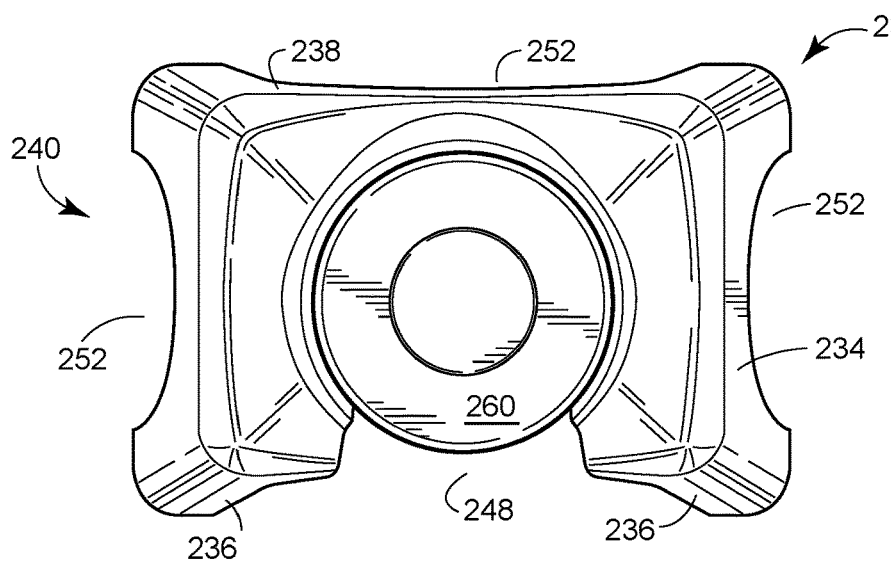
FIG. 10 is a top view of the jack stand and jack pad of FIG. 6.
Figure 11:
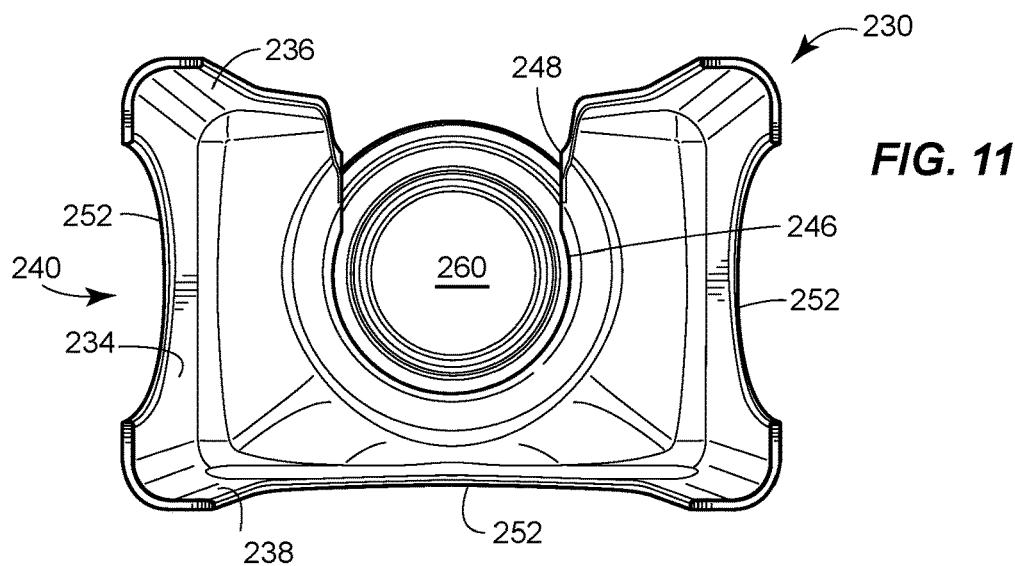
FIG. 11 is a bottom view of the jack stand and jack pad of FIG. 6.

FIGS. 4 and 5 illustrate a second embodiment of a jack stand 130 constructed in accordance with the teachings of the disclosure. Elements in FIGS. 4 and 5 that correspond to like elements in FIGS. 1-3 are numbered exactly 100 greater than the elements in FIGS. 1-3. The jack stand 130 includes two substantially planar front walls 136, two substantially planar side walls 134 and one substantially planar back wall 138. The walls 136, 134, and 138 may be made of metal plates, such as steel, aluminum or titanium, that are welded together along side edges of the walls 136, 134, 138. Alternatively, the walls 136, 134, 138 can be cast or otherwise formed together as a single piece. Alternatively, the walls 136, 134, 138 may be formed by taking a single plate of material and cutting or bending the plate of material to shape the walls 136, 134, 138. The walls 136, 134, 138 form a quadrilateral pyramid-like body 140 with a flat top 132. While the embodiment shown in FIGS. 4 and 5 is generally quadrilateral, the body 140 could be trilateral or any polygonal shape. The body 140 includes a top opening 146 and a front opening 148 that join one another to form a single opening.

The embodiment of FIGS. 4 and 5 differs from the embodiment of FIGS. 1-3 in that the body 140 includes a plurality of circular openings 154. The circular openings 154 on the side walls 134 may function as handles when transporting the jack stand 130. The circular openings 154 in both the side walls 134 and the back wall 156 reduce the amount of material required to form the body and thus reduce overall costs to manufacture the jack stand 130. Additionally, the circular openings 154 may distribute forces through the side walls 134 and back wall 138 similar to the way an arch distributes forces.

The embodiment of FIGS. 4 and 5 also includes cutout portions 159 on the front walls 136. These cut out portions 159 also reduce the amount of material required to manufacture the jack stand 130 and the cut out portions 159 make more room for the jack (not shown) to enter the hollow center portion 142.

The angle of the side walls 134 with respect to the top 132 may vary according to the overall size of the jack stand 130 and the amount of space between a vehicle jacking location and a vehicle wheel. The angled side walls 134 allow the jack stand 130 to be placed closer to a vehicle wheel because the wider portion of the jack stand 130 is located below the widest part of the wheel when the vehicle is raised. Additionally, the pyramid-like shape of the body 140 allows the jack stand 130 to be nested for shipping or storage with other like jack stands 140.

FIGS. 6-12 illustrate yet another embodiment of a jack stand 230 and a jack pad 260 constructed in accordance with the teachings of the disclosure. Elements of the embodiment of FIGS. 6-12 that correspond to elements of the embodiment of FIGS. 1-3 are numbered exactly 200 greater that the elements of the embodiment of FIGS. 1-3.

Figure 12:
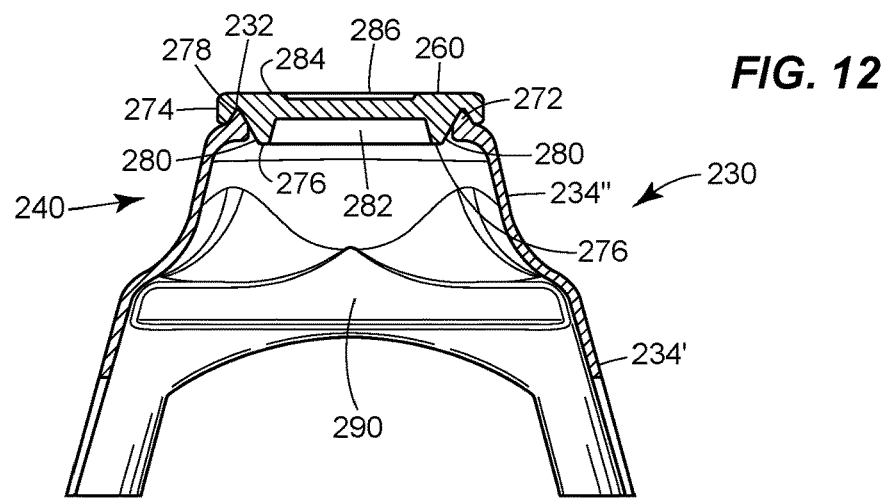
FIG. 12 is a cross-sectional view of the jack stand and jack pad of FIG. 7 taken along line 12-12 of FIG. 7.

The jack stand 230 includes a two step outer wall structure. For example, the side walls 234 include a first sidewall portion 234' and a second side wall portion 234" connected by a fillet 270. The first sidewall portion 234' is generally planar, much like the side walls 134 and 34 of the embodiments of FIGS. 1-5. However, the second side wall portion 234" is more vertically oriented and more rounded. The more vertical orientation leads to less of a spreading force when the jack stand 230 is carrying the load of a vehicle that is elevated. Moreover, as best seen in FIG. 12, the second side wall portion 234" terminates in a raised lip 272 that forms the top 232 of the jack stand 230. Much like the second side wall portion 234", the raised lip 272 is rounded. Rounding the top portion of the jack stand 230 minimizes or reduces the possibility that the bottom of the vehicle will contact the jack stand 230 during lowering of the vehicle onto the jack stand 230. The raised lip 272 surrounds the top opening 246 (FIG. 11) except in the vicinity of the front opening 248.

The jack pad 260 (shown without an upper support portion 62 shown in FIGS. 1 and 2) includes a downturned outer rail 274 and an inner extension 276. The downturned rail 274 and inner extension 276 are joined by an inverted slot 278. The inverted slot 278 is sized and shaped to receive the raised lip 272 of the jack stand 230. Thus, when the jack pad 260 is in place on the top 232 of the jack stand 230, the outer rail 274 surrounds the raised lip 272 and prevents the front opening 248 from spreading apart due to loading of the top 232 of the jack stand 230 when the jack stand 230 is supporting a raised vehicle. Thus, the jack pad 260 of the embodiment of FIGS. 6-12 structurally reinforces the front opening 248 of the jack stand 230. The outer rail 274 also prevents the jack pad 260 from sliding off of the jack stand 230. Additionally, the inner extension 276 includes an angled guiding surface 280. The angled guiding surface 280 centers and guides the jack pad 260 into the top opening 246 when the jack pad 260 is lowered onto the jack stand 230.

The jack pad 260 may also include a recessed bottom portion 282. The recessed bottom portion 282 is sized and shaped to receive a free end of the lifting arm 14 of the floor jack 10 (not shown in FIGS. 12). A top surface 284 of the jack pad 260 includes a mating feature, such as an upper recessed portion 286. The mating feature can receive an upper support portion 62 (FIG. 1) which can be formed to mate with any proprietary jacking location on a vehicle. For example, the recessed portion 286 could receive an upper support portion 62 (FIG. 1) sized to receive and seat a button formed on the bottom of a vehicle. In another embodiment, the mating feature could receive an upper support portion 62 (FIG. 1) formed as a slot sized to receive a pinched weld in the bottom of a vehicle. Still further, the mating feature could receive an upper support portion 62 (FIG. 1) formed as a button to slide into a slot formed on the bottom of a vehicle. In this way, a user can jack virtually any type of vehicle, regardless of the particular configuration of the jacking location, by simply changing the upper support portion 62 or jack pad 260. For example, when jacking vehicles with very low ground clearance, a thin upper support portion 62 may be required so that the jack 210 and jack pad 260 can fit underneath the vehicle.

The jack stand 230 may include one or more strengthening features on an inside of the body 240, such as a reinforcing rib 290. The reinforcing rib 290 may extend across a portion of the back wall 238, or a portion of the side walls 234. The reinforcing rib 290 may also extend across more than one wall. The reinforcing rib 290 may resist the tendency of the body 240 to spread when loaded due to the body 240 shape and the front opening 248.

The disclosed jack stands may be used in conjunction with virtually any type of jack. For example, as will be appreciated by one of skill in the art, the disclosed jack stands may be used in conjunction with scissor-type jacks, commercial floor jacks, racing floor jacks, etc. In addition the disclosed jack stands can be used to support virtually any type of vehicle, such as automobiles, motorcycles, boats, aircraft, etc.

Although certain jack stands have been described herein in accordance with the teachings of the present disclosure, the scope of coverage of this patent is not limited thereto. On the contrary, while the invention has been shown and described in connection with various preferred embodiments, it is apparent that certain changes and modifications, in addition to those mentioned above, may be made. This patent covers all embodiments of the teachings of the disclosure that fairly fall within the scope of permissible equivalents. For example, the jack stand may take on virtually any shape and/or size provided that it is capable of supporting a vehicle as described herein. Many other variations of the invention may also be used without departing from the principles outlined above. Accordingly, it is the intention to protect all variations and modifications that may occur to one of ordinary skill in the art.

What is claimed is:

1. A jack stand for a vehicle comprising:
    a plurality of walls joined together to form a body, the body having a hollow center;
    a base formed by lower edges of the walls;
    a side opening in one of the walls; and
    a top opening formed in a top of the body; and
    a jack pad, the jack pad including a flange that is configured so that the top of the body of the jack stand inserts into the flange, thereby suspending the jack pad at least partially within the top opening;
    wherein the side opening and the top opening extend towards one another and meet proximate the top edge of the body to form a single, continuous opening from the top of the body through a bottom of the body.

2. The jack stand of claim 1, wherein the flange is larger than the top opening.

3. The jack stand of claim 1, wherein the top opening and the side opening are configured to temporarily receive a portion of a floor jack.

4. The jack stand of claim 1, wherein each wall in the plurality of walls includes a lower portion and an upper portion joined by a fillet, the upper portion being more vertically oriented than the lower portion.

5. The jack stand of claim 1, further comprising a reinforcing rib disposed on an inside of the jack stand.

6. The jack stand of claim 1, further comprising a plurality of adjustable feet disposed in a bottom portion of each wall in the plurality of walls.

7. The jack stand of claim 1, further comprising a circular opening in one of the walls.

8. The jack stand of claim 1, further comprising a lower window formed in one of the walls, the lower window being configured to allow a wheel of a floor jack to extend outside of the base while the floor jack is at least partially disposed within the hollow center of the body.

9. A jack stand for a vehicle comprising:
    a plurality of walls joined together to form a body, the body being hollow;
    a base formed by lower edges of the walls;
    a side opening in one of the walls; and
    a top opening formed in a top of the body; and
    a height adjustment mechanism, the height adjustment mechanism being configured to adjust an overall height of the body;
    wherein the side opening and the top opening extend towards one another and meet proximate the top edge of the body to form a single, continuous opening.

10. The jack stand of claim 9, wherein the height adjustment mechanism comprises a plurality of adjustable feet disposed in a bottom portion of each wall in the plurality of walls.

11. The jack stand of claim 9, further comprising a top surface that is recessed below a top edge of the body.

12. The jack stand of claim 11, further comprising a jack pad, the jack pad including an upper support portion and a flange surrounding the upper support portion, the flange being configured to rest on the top surface, thereby suspending the upper support portion at least partially within the top opening.

13. The jack stand of claim 12, wherein the flange is larger than the top opening.

14. The jack stand of claim 9, wherein the top opening and the side opening are configured to temporarily receive a portion of a floor jack.

15. The jack stand of claim 9, wherein each wall in the plurality of walls includes a lower portion and an upper portion joined by a fillet, the upper portion being more vertically oriented than the lower portion.

16. The jack stand of claim 9, further comprising a reinforcing rib disposed on an inside of the jack stand.

17. The jack stand of claim 9, further comprising a circular opening in one of the walls.

18. A method of elevating a portion of a vehicle comprising:
    providing a jack;
    removably placing a jack pad on one end of the jack;
    placing the jack beneath a portion of the vehicle;
    extending the jack until the jack pad contacts a portion of the vehicle and the jack elevates a portion of the vehicle;

providing a jack stand, the jack stand including a jack stand base;

positioning the jack stand around the jack so that a portion of the jack is located at least partially within a hollow portion of the jack stand base;

lowering the jack until the jack pad contacts and is supported by a top portion of the jack stand base;

continuing to lower the jack until the jack pad is fully supported by the jack stand base and the jack pad is separated from the jack, the jack pad structurally reinforcing an opening in the jack stand by preventing spreading of the opening when the jack stand is loaded with weight; and removing the jack from the jack stand, wherein both the jack stand and the jack can support the vehicle at the same location on the vehicle chassis, and the jack pad interlocks with the jack stand base, thereby forming a structural portion of the jack stand when the jack pad and the jack stand base are interlocked and the jack is lowered and removed.

* * * * *